May 25, 1954

G. REZEK ET AL 2,679,549

APPARATUS FOR HEATING COLD BATTERIES

Filed April 17, 1951

INVENTORS
GERARD REZEK
LEWIS A. MEDLAR
BY
Stone, Boyden & Mack,
ATTORNEYS.

Patented May 25, 1954

2,679,549

UNITED STATES PATENT OFFICE 2,679,549

APPARATUS FOR HEATING COLD BATTERIES

Gerard Rezek, Philadelphia, and Lewis A. Medlar, Oreland, Pa., assignors, by mesne assignments, to Fox Products Company, Philadelphia, Pa., a corporation of Pennsylvania Application April 17, 1951, Serial No. 221,368

5 Claims. (Cl. 136—161)

This invention relates to the heating of cold batteries, and more particularly to an improved apparatus for internally heating cold storage batteries by passing an alternating current through the battery.

Use of storage batteries in cold environments has heretofore involved considerable difficulty. The electrolyte of a conventional lead-acid storage battery will begin to freeze at temperatures below 0° F., the precise freezing point depending upon the specific gravity of the electrolyte. Even if the specific gravity of the electrolyte is sufficient to prevent freezing, a very cold lead-acid storage battery has difficulty in delivering current, both because the electrical resistance of the electrolyte varies inversely as the temperature and because the electrolyte, when very cold, becomes so viscous as to limit the rate at which the ions of the electrolyte can migrate into the pores of the battery plates. Though storage batteries having specially constructed plates are now available for cold weather use, and such batteries are capable of delivering more current at unusually low temperatures than are conventional batteries, this has not solved the problem. First, even the specially designed "cold weather" batteries can only be discharged to about 85% of normal capacity at −60° F. before the electrolyte begins to freeze. And finally, neither the conventional batteries nor the batteries with specially designed plates will accept a substantial charge at very low temperatures. The application of even a very small charging current to a storage battery at temperatures below 0° F. results in serious gassing of the battery with substantially no resulting charging action. A storage battery which cannot be recharged is of course substantially useless for field operation, and it is therefore highly desirable to be able to heat storage batteries quickly and efficiently.

Various attempts have been made in the past to provide means for warming exceptionally cold storage batteries. First, and simplest, the battery has been removed to a warm room and allowed to stand until warm enough to charge. But, since the battery casing is a poor thermal conductor, this procedure is far too slow to be satisfactory. Attempts have also been made to apply heat to the exterior of the battery, as by external heating units, but this method is also impractical for most purposes because of the low heat conductivity of the battery casing. Further, it has been proposed to employ an electrical resistance heater inside of the battery. However, internal heating elements are unsatisfactory because they present a difficult problem of sealing the casing where the heating element enters, the heating element occupies valuable space within the battery, and standardization of the battery is made more difficult.

Finally, it has been proposed, as seen in United States Patent 2,442,380 to Vinal et al., that dry batteries be heated by passing an alternating current through the battery, heat being generated because of the internal resistance of the battery. When an alternating current is passed through a battery, some means must be employed to prevent the flow of direct current from the battery during the half cycle of the alternating current passing in the discharging direction, and for this purpose it has been suggested, as seen in the aforementioned patent, that a condenser or a blocking battery be employed in series with the battery to be heated.

We have found that subjecting the cold battery to alternating current is a most practical method for heating storage batteries, if discharging of the battery can be prevented. Unfortunately, the use of a blocking battery to prevent discharging is not satisfactory, particularly for purposes involving military equipment, since the problem of maintaining the blocking battery usually involves too much trouble and attention. Also, the use of a simple series connected condenser has proved economically unfeasible. If a 200 ampere heating current at 60 cycles is to be passed through a battery, and a simple series-connected condenser is employed to block the battery discharge, the capacity of the condenser would have to be so great that it would cost about $540. However, the size of the condenser can be reduced as the frequency of the alternating current is increased, and it would be quite feasible, as far as cost of the condenser above is concerned, to employ such an apparatus to heat a battery with a 200 ampere, 400 cycle current. But, with a simple series connected condenser, it would be necessary to operate the condenser at a voltage of about 220 volts, while the voltage drop across the battery due to the alternating current would be on the order of only 5 volts, depending upon the size of the battery. Thus, since practically the entire voltage drop would then be across the condenser, the power factor of the load would be substantially zero. Moreover, such an apparatus would draw about 44 kilovolt amperes from the power source, and where individual power generating equipment is required, the cost and size of such equipment would be entirely out of reason for the result obtained.

The object of the present invention is to provide apparatus for heating cold storage batteries by the use of an alternating current and including a condenser to prevent discharge of the battery, wherein the aforementioned disadvantages involved in the use of the condenser are overcome.

To this end the invention contemplates the provision of a heating circuit for connecting the battery across a source of alternating current, a condenser connected in the heating circuit in series with the battery, and an inductance so connected in the circuit as to form a resonant circuit with the condenser.

In order that the invention may be understood in detail, reference is had to the accompanying drawings which form a part of this specification and wherein.

We have found that the difficulties presented by use of a series connected condenser in a battery heating circuit to block the battery discharge are overcome if the condenser is made part of a resonant circuit. This is accomplished by employing an inductance connected either in series with the condenser or in parallel, the values of the inductance and the capacitance being so chosen that the natural period of the resonant circuit is equal to the period of the impressed voltage. When this is true, the inductance and capacitance act in opposition, so that at each instant energy is being stored or released in the magnetic field of the inductance at exactly the same rate as energy is being released or stored in the charge of the condenser. Thus, in effect, the inductive reactance of the inductance cancels the capacitive reactance of the condenser, leaving only the ohmic resistance of the circuit. Yet the condenser fully blocks the discharge of direct current from the battery.

Only sufficient voltage need be applied to the heating circuit as a whole to overcome the I. R. drop, that is, the pure ohmic resistance multiplied by the current. In the battery heating circuits of the present invention, this voltage would be on the order of only 5–10 volts, as compared to voltages on the order of 220 volts which would be necessary if a simple series connected condenser were employed to block the battery discharge.

Figure 1:
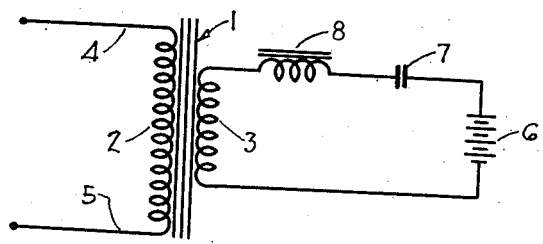
Fig. 1 is a schematic diagram of one embodiment of the invention.

The embodiment of the invention illustrated diagrammatically in Fig. 1 includes a transformer 1 having a primary winding 2 and a secondary winding 3. The primary winding 2 is connected by conductors 4 and 5 to a suitable source of alternating current, and the secondary winding 3 is connected to the battery heating circuit. In the heating circuit, the battery 6 to be heated is connected in series with a condenser 7 and a choke coil 8. The condenser 7 serves to block any discharge of the battery 6 through the heating circuit, and the series combination of the condenser 7 and the choke 8 forms a resonant circuit. The values of the condenser and the choke are so chosen that the natural period of the resonant circuit is equal to the period of the alternating current supplied to the primary winding 2 of the transformer. While the condenser 7 is effective to block the battery discharge, the operation of the resonant circuit comprising the condenser 7 and the choke 8 allows a relatively low supply voltage to produce an ample heating current.

Figure 2:
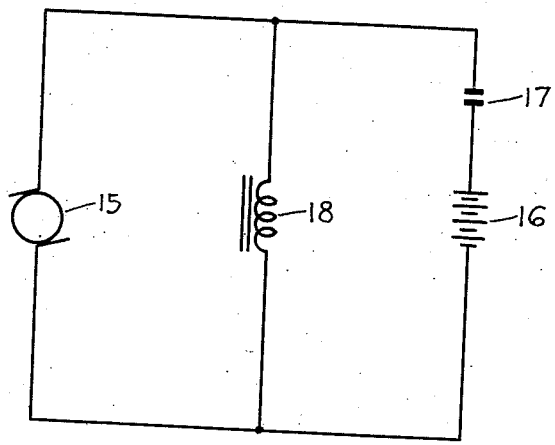
Fig. 2 is a schematic diagram of another embodiment of the invention.

In the circuit just described, the series resonant circuit offers a relatively low impedance to the supply voltage, and the transformer for supplying a low voltage is therefore necessary. In the embodiment shown in Fig. 2, the transformer has been omitted, the battery 16 to be heated being connected in series with the alternating current supply 15 and the condenser 17, so that while alternating current may flow through the battery to heat the same the battery cannot discharge through the heating circuit. The choke 18 is connected in parallel with the series combination of the battery 16 and the condenser 17, forming a parallel resonant circuit. Both branches of the parallel resonant circuit offer a high impedance to the power source, and therefore can withstand the usual supply voltage. At the same time, high circulatory currents are developed through the condenser, choke and battery. In effect, the parallel circuit acts as its own transformer, taking high voltage, low current power from the source 15 and transforming it into low voltage, high current circulating currents suitable for internally heating the battery.

The invention is particularly well adapted for use in heating storage batteries employed in military equipment. The apparatus operates at high efficiency and a relatively low voltage power supply can be used. This is particularly important, since field operation requires both light weight, readily portable self-contained units, and compact light weight units which can be built into vehicles and other apparatus employing storage batteries.

We claim:

1. In an apparatus for internally heating a cold storage battery, the combination of a heating circuit for connecting the battery across a source of alternating current, a condenser connected in said heating circuit in series with the battery to prevent the battery from discharging through said heating circuit, and an inductance connected with said condenser to form a resonant circuit interposed between the battery and said source, the natural period of said resonant circuit being substantially equal to the period of the alternating current supplied by said source.

2. In an apparatus for internally heating a cold storage battery, the combination of a heating circuit for connecting the battery across a source of alternating current, a condenser connected in said heating circuit in series with the battery to prevent the battery from discharging through said heating circuit, and an inductance connected in series with said condenser to form a resonant circuit, the natural period of said resonant circuit being substantially equal to the period of the alternating current supplied by said source.

3. In an apparatus for internally heating a cold storage battery, the combination of a transformer having a primary winding and a secondary winding, circuit means for connecting said primary winding to a source of alternating current, an electrical circuit for connecting the battery across said secondary winding, and a condenser and a choke connected in said circuit in series with the battery to form a resonant circuit having a natural period substantially equal to the period of the alternating current supplied by said source.

4. In an apparatus for internally heating a cold storage battery, the combination of a heating circuit for connecting the battery across a source of alternating current, a condenser connected in said heating circuit in series with the battery to prevent the battery from discharging through said heating circuit, and an inductance connected in parallel with the series combination of said condenser and the battery to form a resonant circuit having a natural period substantially equal to the period of the alternating current supplied by said source.

5. In an apparatus for internally heating a cold storage battery, the combination of an alternating current generator, a heating circuit connecting the battery directly to said generator, a condenser connected in said circuit in series with the battery to prevent the battery from discharging through said heating circuit, and a choke connected across the series combination of said condenser and the battery to form a resonant circuit having a natural period substantially equal to the period of the alternating current to be supplied by said generator.

References Cited in the file of this patent

UNITED STATES PATENTS

| Number | Name | Date |
|---|---|---|
| 2,442,380 | Schrodt et al. | June 1, 1948 |
| 2,448,349 | Black | Aug. 31, 1948 |
| 2,498,814 | Little et al. | Feb. 28, 1950 |
| 2,566,969 | Sorenson | Sept. 4, 1951 |

FOREIGN PATENTS

| Number | Country | Date |
|---|---|---|
| 26,688 of 1905 | Great Britain | Dec. 21, 1905 |

OTHER REFERENCES

Shrodt et al., Publication, PB27275, A. C. Heating, August 18, 1941, pages 54–56.

Crocker & Arendt, Storage Batteries, 1921, page 3.